Figure 3:
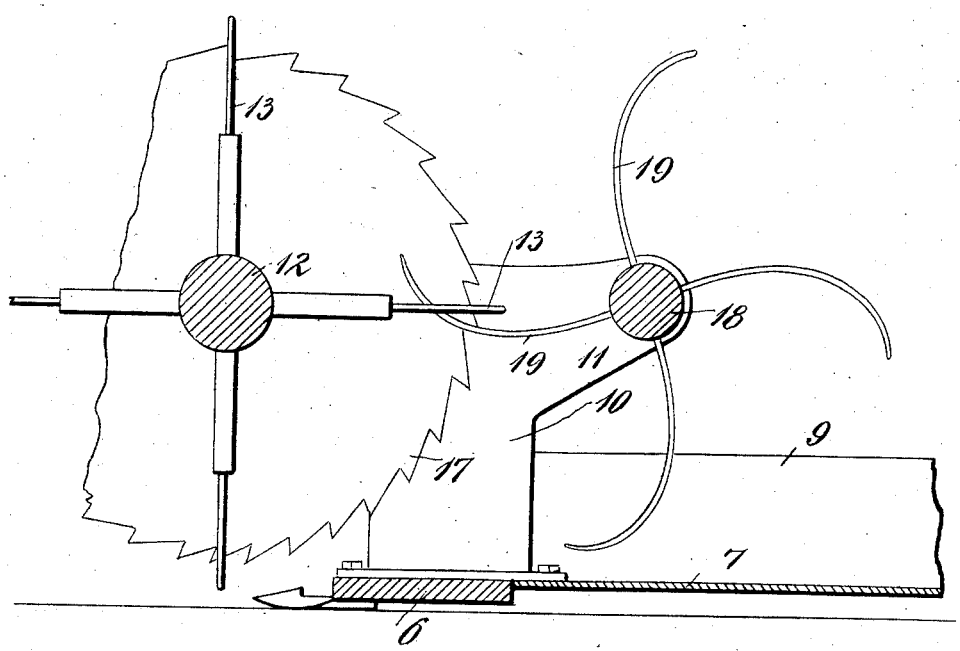

No. 882,969. PATENTED MAR. 24, 1908.
F. RUMP.
HARVESTER.
APPLICATION FILED OCT. 30, 1907.
2 SHEETS—SHEET 1.
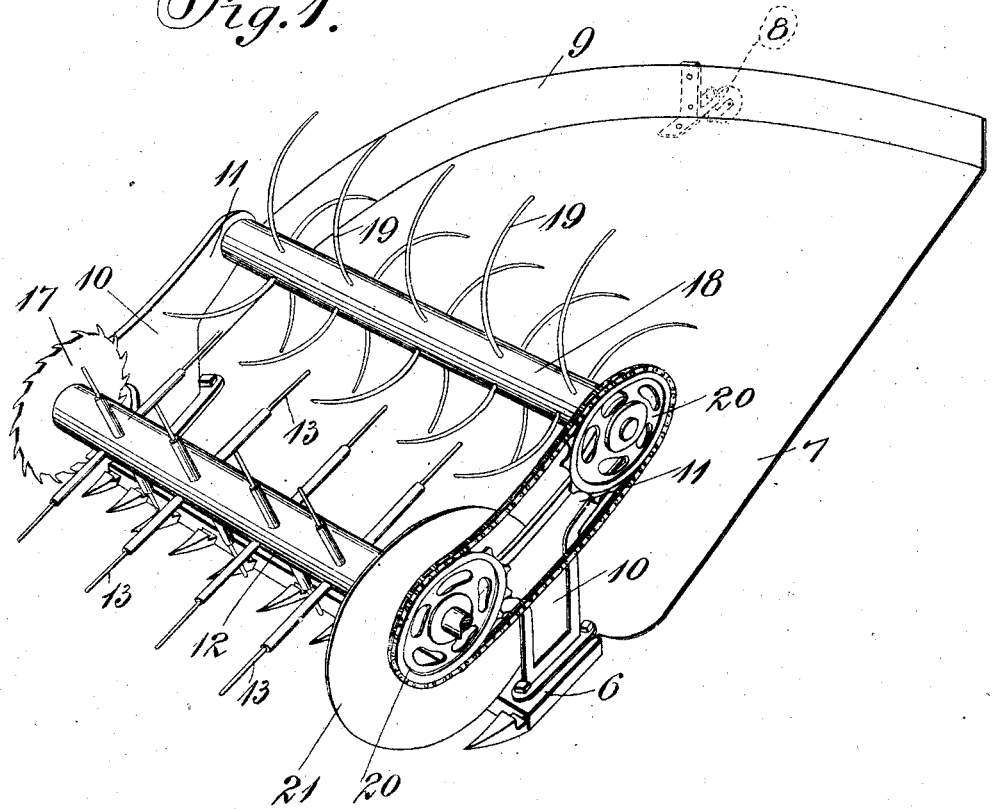
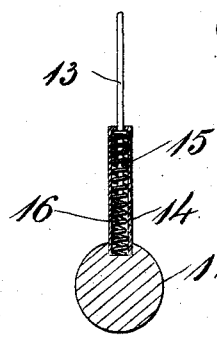
Witnesses
Friederich Rump,
Inventor No. 882,969.

PATENTED MAR. 24, 1908.

F. RUMP.

HARVESTER.

APPLICATION FILED OCT. 30, 1907.

2 SHEETS—SHEET 2.

UNITED STATES PATENT OFFICE.

FRIEDERICH RUMP, OF CHEBOYGAN, MICHIGAN.

HARVESTER.

No. 882,969.     Specification of Letters Patent.     Patented March 24, 1908.

Application filed October 30, 1907. Serial No. 399,790.

*To all whom it may concern:*

Be it known that I, FRIEDERICH RUMP, a citizen of the United States, residing at Cheboygan, in the county of Cheboygan and State of Michigan, have invented certain new and useful Improvements in Harvesters, of which the following is a specification.

This invention is an attachment for mowing machines, and adapted to be attached to any of the ordinary mowing machines now in general use, and it is especially designed for the purpose of harvesting peas.

With an ordinary machine, when peas are harvested, it is necessary to have men in the field to move the vines to one side before the machine comes around again the next time, in order to clear the swath and avoid clogging the machine.

The object of the present invention is to form an improved device which will clear and convey vines from the cutter bar and discharge the same to one side, behind the machine and clear of the remaining or standing plants, so that the machine will have a free course on the next time around.

The invention is illustrated in the accompanying drawings, in which

Figure 1 is a perspective view of the attachment. Fig. 2 is a detail in section of one of the fingers of the reel. Fig. 3 is a sectional view of the reels.

Referring specifically to the drawings, 6 indicates a bottom bar or cross piece located at the front end of a platform 7, and adapted to be attached in any suitable manner to the finger bar of the mower. The platform is supported at the back by a small wheel shown in the dotted lines at 8. The platform is segmental in shape, and has at its outer or rear edge a standing board 9 which guides the grain around over the platform and out at the rear on the inner side, in a manner common or well known in harvester platforms.

Mounted upon each end of the bar 6 and at the front of the platform is a standard 10, having arms 11 which project forwardly and rearwardly respectively and which support the front and rear reels. The front reel consists of a shaft or roller 12 and a series of straight fingers 13, arranged in rows along the shaft or roller; and said roller has bearings at the ends in the arms 11.

One of the fingers 13 is shown in detail in Fig. 2, and it consists of a small iron tube 14, fixed at one end in the shaft and having a wire or rod 15 projecting therefrom, with a coiled spring 16 located in the tube behind the rod. This construction allows the finger to telescope, by permitting the rod to be pushed back in the tube, the object being to allow the finger to yield when the vines are thick and heavy, and to thereby avoid clogging.

The roller 12 of the front reel has a circular cutter or saw 17 at its outer end, the purpose and function of which is to divide the cut vines from the standing vines and to prevent pulling and entanglement of the vines.

The front reel is positioned or supported so that when the attachment is applied to a machine said reel will be located directly over the knives of the cutter bar, and will act upon the material as soon as it is cut to deliver the same backwardly toward the platform.

Behind the front reel is the rear or clearing reel, consisting of a roller 18 supported on the rearwardly extending arms 11, and provided with curved fingers 19, which pass between the rows of fingers of the front reel, as shown, and the purpose of this reel is to clear the vines from the front reel and carry the same backwardly on the platform. The points of the curved fingers are presented backwardly with respect to the direction of rotation, so that said fingers will clear themselves from the vines as said vines are pushed back under the reel.

The axles of the rollers are provided with sprocket wheels, 20, to which a driving belt may be applied and driven by any suitable connections to the driving wheel of the machine.

In operation, the grain or vines cut by the mowing machine are carried back under the reels and upon the platform and delivered at the rear inner edge thereof, behind the mowing machine. A large circular disk 21, located at the inner end of the front reel, serves to retain or confine the vines at the inside and to prevent them from working out into the gearing or operating parts of the mower.

I claim:

1. An attachment for mowing machines, comprising a delivery platform adapted to be supported behind the cutting devices, a front reel over the front of the platform, and a rear reel over the platform behind said front reel and having clearing devices operating on said front reel, said reels coöperating with the platform to carry material backward upon said platform and under the reels.

2. An attachment for mowing machines, comprising a delivery platform, a reel extending horizontally over the front end of the platform, and a circular guard disk mounted on the inner end of the reel, substantially as and for the purpose described.

3. An attachment for mowing machines, comprising a delivery platform, a front reel having projecting fingers, located over the front of the platform, and a rear reel, mounted over the platform behind the front reel and having curved clearing fingers which work between the fingers of the front reel to clear the same said reels coöperating with the platform to carry backward material on said platform.

4. A reel of the kind described, comprising a shaft and a series of fingers projecting therefrom, each finger consisting of a tube fixed at one end to the shaft, a rod projecting from the other end of the tube, and movable in and out, and a spring in the tube, behind the rod.

In testimony whereof I affix my signature, in presence of two witnesses.

FRIEDERICH RUMP.

Witnesses:
   JNO. E. FROST,
   V. D. SPRAGUE.